United States Patent
Eyb

(10) Patent No.: US 10,005,241 B2
(45) Date of Patent: Jun. 26, 2018

(54) METHOD FOR PRODUCING A ROTOR BLADE AND ROTOR BLADE OF A WIND TURBINE

(71) Applicant: SENVION SE, Hamburg (DE)

(72) Inventor: Enno Eyb, Kiel (DE)

(73) Assignee: SENVION SE, Hamburg (DE)

( * ) Notice: Subject to any disclaimer, the term of this patent is extended or adjusted under 35 U.S.C. 154(b) by 558 days.

(21) Appl. No.: 14/424,084

(22) PCT Filed: Aug. 1, 2013

(86) PCT No.: PCT/EP2013/066173
§ 371 (c)(1),
(2) Date: Feb. 26, 2015

(87) PCT Pub. No.: WO2014/032901
PCT Pub. Date: Mar. 6, 2014

(65) Prior Publication Data
US 2015/0224719 A1    Aug. 13, 2015

(30) Foreign Application Priority Data

Aug. 28, 2012 (DE) .................. 10 2012 107 932

(51) Int. Cl.
*B29C 67/24* (2006.01)
*B29C 70/44* (2006.01)
(Continued)

(52) U.S. Cl.
CPC ........ *B29C 67/246* (2013.01); *B29C 44/5618* (2013.01); *B29C 70/443* (2013.01);
(Continued)

(58) Field of Classification Search
CPC .... B29D 99/00; B29D 99/0025; B29C 70/48; B29C 70/865; B29C 70/443; B29C 44/5618; B29C 67/246
See application file for complete search history.

(56) References Cited

U.S. PATENT DOCUMENTS

2009/0169392 A1* 7/2009 Kuroiwa ............... F03D 1/0675
                                                        416/241 A
2010/0261000 A1   10/2010 Jones
(Continued)

FOREIGN PATENT DOCUMENTS

DE          101 56 123 A1   5/2003
DE     10 2010 002 131 A1   8/2011
(Continued)

OTHER PUBLICATIONS

"Structural Design of Composite Blades for Wind and Hydrokinetic Turbines", Danny Sale and Alberto Aliseda, Northwest National Marine Renewable Energy Center, Dept. of Mechanical Engineering, University of Washington, Feb. 13, 2012.
(Continued)

*Primary Examiner* — Woody Lee, Jr.
*Assistant Examiner* — Maxime Adjagbe
(74) *Attorney, Agent, or Firm* — Bay State IP, LLC

(57) ABSTRACT

The invention relates to a method for producing a rotor blade by arranging foam (23, 24) in a semi-finished product, introducing resin into the foam-containing semi-finished product, and curing the introduced resin while heat is dissipated and a curing temperature distribution is obtained, a first foam (23) being arranged in regions of the semi-finished product with a higher curing temperature, and a second foam (24) in regions with a lower curing temperature, and a foam with a higher temperature resistance than the second foam (24) being chosen as the first foam (23).

9 Claims, 1 Drawing Sheet

(51) Int. Cl.
*B29D 99/00* (2010.01)
*B29C 44/56* (2006.01)
*B29C 70/86* (2006.01)
*F01D 5/28* (2006.01)
B29K 25/00 (2006.01)
B29K 27/06 (2006.01)
B29K 75/00 (2006.01)
B29L 31/08 (2006.01)

(52) U.S. Cl.
CPC ........ *B29C 70/865* (2013.01); *B29D 99/0025* (2013.01); *F01D 5/282* (2013.01); *B29K 2025/06* (2013.01); *B29K 2025/08* (2013.01); *B29K 2027/06* (2013.01); *B29K 2075/00* (2013.01); *B29K 2625/06* (2013.01); *B29K 2715/003* (2013.01); *B29L 2031/085* (2013.01); *Y02E 10/721* (2013.01); *Y02P 70/523* (2015.11)

(56) References Cited

U.S. PATENT DOCUMENTS

2011/0076442 A1 3/2011 Simmerer et al.
2011/0262283 A1* 10/2011 Hancock ............... B25B 11/02
416/226

FOREIGN PATENT DOCUMENTS

| DE | 10 2010 002131 | | 8/2011 |
|---|---|---|---|
| DE | 10 2010 013 405 | A1 | 10/2011 |
| EP | 1 779 997 | A2 | 5/2007 |
| EP | 2 309 124 | A1 | 4/2011 |
| GB | 2 410 458 | A | 8/2005 |
| WO | 2007 038930 | | 4/2007 |
| WO | 2009 003476 | A1 | 1/2009 |
| WO | 2009 003477 | A1 | 1/2009 |
| WO | 2009 047483 | | 4/2009 |
| WO | 2011 035541 | | 3/2011 |
| WO | 2011 081662 | | 7/2011 |
| WO | 2011081662 | | 7/2011 |

OTHER PUBLICATIONS http://depts.washington.edu/nnmrec/documents.html from "Northwest National Marine Renewal Energy Center", Univeristy of Washington.
http://depts.washington.edu/nnmrec/docs from "Northwest National Marine Renewal Energy Center", Univeristy of Washington.
Core-Cell A-Foam, product description.
G-PET, product description.
"Modeling and Simulation of Flow Pattern and Curing During Manufacturing of Composite Wind Turbine Blades Using VARTM Process", Thesis by Ramin Karaminezhaad Ranjbar, University of Kerman, 2003.
"Core for composites: Winds of Change", Jeff Sloan, Composite World CW.
"Focused Performance, Divinycell Matrix", DIAB.
"Getting to the Core of Composite Laminates", Sara Black, Composite World CW.
"Divinycell, The Ultimate Core for Sandwich Structures", DIAB.
"Materials Technology for the Wind Energy Market" (published on May 5, 2007).
"Vacuum Infusing Processing with DIAB core materials—A guide to Resin Infusion for Fiber-Reinforced Composites" (published on Nov. 19, 2002).

* cited by examiner

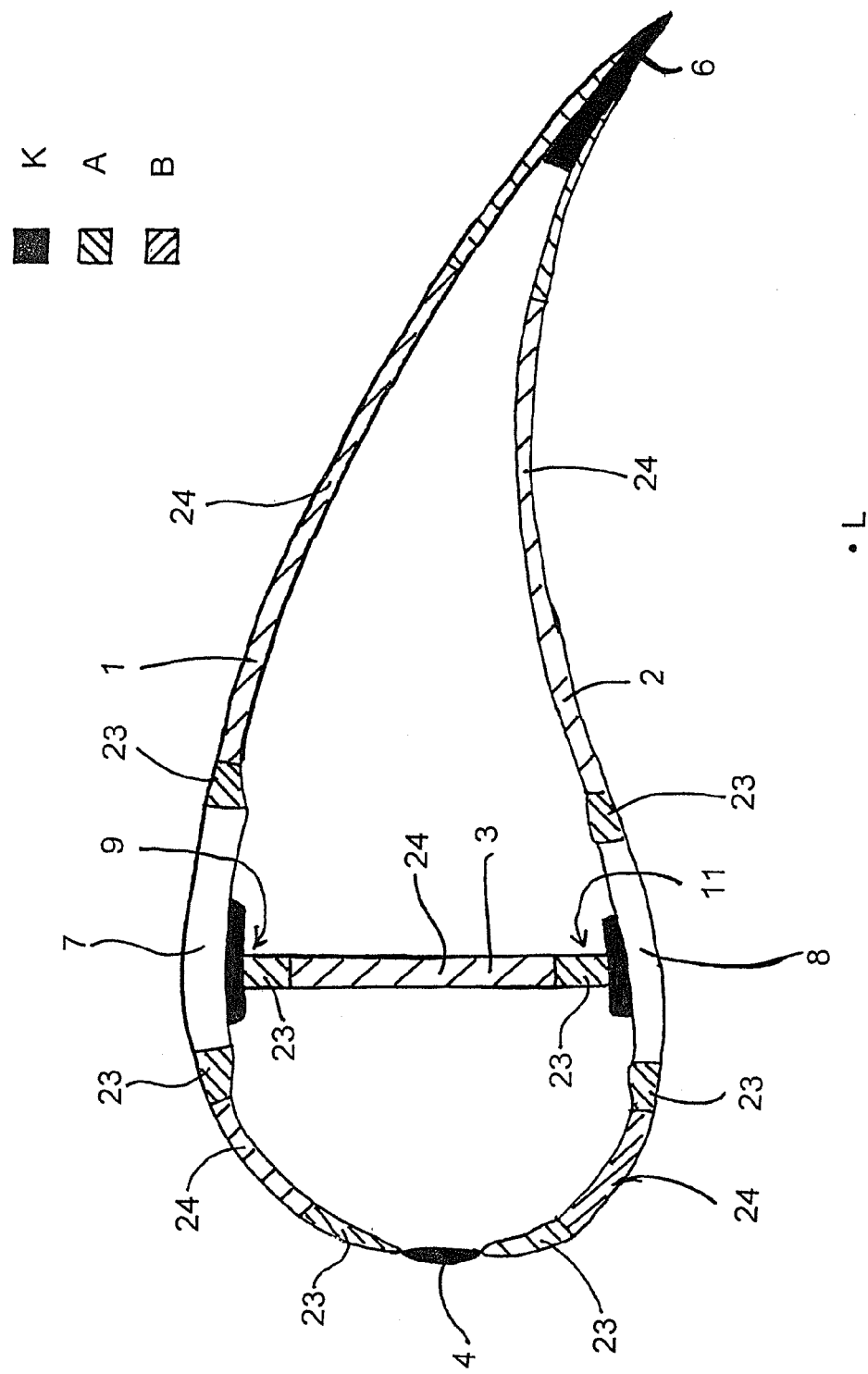

METHOD FOR PRODUCING A ROTOR BLADE AND ROTOR BLADE OF A WIND TURBINE

CROSS REFERENCE TO RELATED APPLICATION

This application is for entry into the U.S. National Phase under § 371 for International Application No. PCT/EP2013/066173 having an international filing date of Aug. 1, 2013, and from which priority is claimed under all applicable sections of Title 35 of the United States Code including, but not limited to, Sections 120, 363, and 365(c), and which in turn claims priority under 35 USC 119 to German Patent Application No. 10 2012 107 932.3 filed on Aug. 28, 2012.

BACKGROUND OF THE INVENTION

Field of the Invention

The invention relates to a method of producing a rotor blade according to the preamble of claim 1, and well as to a rotor blade produced in a method in accordance with the invention according to the preamble of claim 6.

Methods of producing rotor blades are naturally known in the prior art.

As a rule, conventional rotor blades have two half shells, along the longitudinal direction of which one belt is provided in each case. The belt is a fibre-reinforced region of the half shell of the rotor blade which is capable of being loaded relatively heavily mechanically. A single web or a plurality of webs, which increases or increase the buckling resistance and the bending resistance of the rotor blade, is or are provided between the belts of the mutually opposed half shells of a rotor blade. The half shells of the rotor blade are glued to each other at their front and rear edges and are glued to the webs along the belts.

The regions between the front edge and the belt and between the rear edge and the belt of each of the half shells of the rotor blade are conventionally formed in a sandwich design. During the production process a resin system is introduced into a dry, multiple-layer lattice which reacts exothermically in the semi-finished product and hardens under the additional subsequent supply of heat. A fibre-reinforced layer on the outside of the rotor blade and a fibre-reinforced layer on the inside of the rotor blade are provided, between which a foam material is arranged.

Description of the Related Art

A method of producing a fibre-reinforced product using a resin-infusion method RTM (resin transfer moulding) is known from WO 2007/038930 A.

In addition, a method of producing fibre-reinforced plastics material components from dry fibre-containing semi-finished product is known from DE 24 134 09 C1, in which a resin system is introduced into the semi-finished product by means of an injection method. During the hardening of the resin system, the resin system passes through an exothermic peak during an exothermic reaction, which can quite possibly reach 180° C. In addition, after passing through the exothermic peak, for the complete hardening of the resin system the resin system has to be tempered further to a process temperature of from 50° C. to 100° C. over several hours in order to be completely hardened.

In order to produce the rotor blades, therefore, temperature-resistant foam materials are necessary. A drawback of the latter, however, is that they are relatively expensive.

The object of the invention is therefore to make available a method of producing a more inexpensive rotor blade as well as to make available a more inexpensive rotor blade.

SUMMARY OF THE INVENTION

The object is attained in its first aspect by a method with the features of claim 1.

Rotor blades are preferably formed from components produced separately, such as rotor blade half shells and webs. The separate components are produced in manufacturing moulds specified individually for them. First of all a plurality of layers, for example layers of fabric, foam materials, balsa etc., are laid one above the other and/or adjacent to one another in the manufacturing moulds. The layers arranged in this way form a preferably dry semi-finished product. The semi-finished product is impregnated with a resin system in methods such as for example resin injection moulding (RIM method) or resin transfer moulding (RTM method). The resin system hardens in an initially exothermic chemical reaction and with the subsequent supply of heat inside the semi-finished product. After the semi-finished product has passed through a so-called exothermic peak in the exothermic reaction, heat is supplied to it externally in order to keep it at a lower process temperature. The resin system then hardens completely at the process temperature. In particular, when passing through the exothermic peak, the temperature stressing of the individual layers and component parts of the semi-finished product is considerable. It is therefore necessary for materials to be selected which have an adequate temperature resistance. The temperature resistance of a material is understood in this case as being that the material can be subjected to a specified temperature over a period of several hours without the condition thereof being adversely affected.

The invention makes use of the knowledge that during the hardening of the resin, in particular when passing through the exothermic peak, the temperature distribution is not the same over the entire semi-finished product impregnated with the resin system. In particular, higher temperatures arise in the region of multiple-layer fabric layers which are impregnated with a resin system, since it is more difficult for the heat occurring to escape, whereas in regions which are formed in a simple sandwich design the exothermic peaks occur to a lesser degree. In addition, the exothermic peaks in the case of a simple sandwich design will occur for a shorter time since the heat can be dissipated more rapidly than in the case of multiple-layer laminates.

The invention makes use of the knowledge of the unequal temperature distribution during the hardening and proposes a method of producing a rotor blade by a first foam material being provided in regions of the semi-finished product in which a first hardening temperature is set and by a second foam material being provided in regions in which a second hardening temperature is set and by the first foam material selected being a foam material with a higher temperature resistance than the second foam material. The first hardening temperature is higher in this case than the second hardening temperature. It can be higher by 10° C. or 20° C., i.e. a higher temperature is understood in this case as being that the first hardening temperature over the duration of the exothermic peak or the duration of the hardening procedure as a whole is higher than the second hardening temperature. It is also possible, however, for only the average of the first hardening temperature over the aforesaid duration to be higher than the average of the second hardening temperature. In addition, the first hardening temperature is also understood as being a higher hardening temperature and the second hardening temperature is understood as being a lower hardening temperature.

It has been found that higher hardening temperatures occur during the production of half shells of rotor blades, in particular in regions along the belts formed from a plurality of layers of fabric, so that foam-containing areas of the rotor blade half shells adjacent to the belts are formed with a first foam material with a first higher temperature resistance, whilst areas of the rotor blade shells with a lower hardening temperature are formed from the second foam material with a second lower temperature resistance than the first temperature resistance.

The first foam material can be PVC, SAN or polyurethane foam materials as well as portions of balsa wood, from which the half shells of the rotor blade were produced completely in the prior art. According to the invention only those regions of the half shells of the rotor blade affected by a high hardening temperature during the production are filled with the first more expensive foam material, whilst the regions which are subjected to lower hardening temperatures can be formed with a more inexpensive foam material which has a lower temperature resistance. The foam material with the lower temperature resistance can be for example foam materials of polystyrene such as the foam material Compaxx® 900 of the firm Dow Chemical.

Each of the half shells of the rotor blade has at least one belt which is arranged along the semi-finished product in a longitudinal direction and which has longitudinal sides extending in the longitudinal direction. In a preferred embodiment of the method according to the invention the first foam material is arranged in a strip along the two longitudinal sides of the at least one belt between the at least one belt and the second foam material. In this way, the first foam material acts as a buffer between the at least one belt and the second foam material; a higher hardening temperature is formed in the region of the first foam material during the hardening.

In addition, higher hardening temperatures are also formed in regions of adhesion areas.

In a further preferred embodiment of the invention the first foam material is arranged in a strip directly along a front edge and/or rear edge of the semi-finished product of the shell of the rotor blade. The two half shells of the rotor blade are glued to each other at the front edge and/or rear edge, and the second foam material is arranged in the respective half shell of the rotor blade at a distance from the front edge and rear edge. In this way, it is advantageous for only the regions subjected to a high hardening temperature by the adhesion of the half shells during the production of the rotor blade to be provided with the first high-temperature-resistant foam material.

In a further preferred embodiment of the invention the first foam material is arranged along the web bases in a semi-finished product of a web having opposed bases. During the production of the rotor blade, at least one web is usually glued between the two belts between the two half shells of the rotor blade in the interior of the rotor blade. An increased hardening temperature is also formed at the web bases, and it is also preferable for only the regions of the web subjected to the higher hardening temperature to be provided with the first high-temperature-resistant foam material.

In its second aspect the object is attained by a rotor blade named in the introduction and having the characterizing features of claim 6.

According to the invention the rotor blade named in the introduction has a first foam material in regions in which a higher hardening temperature is set during the hardening and a second foam material in regions in which a lower hardening temperature is set, the first foam material having a higher temperature resistance than the second foam material.

The arrangement of the first foam material and the second foam material in the regions which are subjected to an increased hardening temperature or not such a high hardening temperature respectively during the production procedure mirrors the invention. The first foam material is preferably from the group PVC, SAN and PU, whereas the second foam material can comprise a polystyrene, preferably the polystyrene Compaxx® 900 of the firm Dow Chemical.

It is advantageous for the rotor blade to comprise a half shell on the under-pressure side and a half shell on the over-pressure side, and for the first foam material to be arranged in the form of a strip along adhesion areas between the front edges and/or rear edges of the shells of the rotor blade in the form of a strip along the half shells of the rotor blade. In this case the first foam material is preferably provided precisely along the edges of the respective half shells, so that the actual adhesion areas are adjacent only to areas which contain the first foam material.

In a preferred embodiment of the invention the half shell of the rotor blade on the under-pressure side and the half shell of the rotor blade on the over-pressure side have at least one belt in each case, the first foam material being arranged in the form of a strip along belt edges between the belts and the second foam material. In this way, the first foam material is arranged in the areas which are subjected to high hardening temperatures. That is, the areas which are directly adjacent to the belts.

In a particularly preferred embodiment of the invention at least one web is provided which has opposed bases, the first foam material being designed in the form of strips and extending over the entire longitudinal direction of the web along the web bases.

BRIEF DESCRIPTION OF THE DRAWINGS

The invention is described in a figure with reference to an embodiment. In this case FIG. 1 is a section at a right angle to the longitudinal direction of a rotor blade according to the invention.

DETAILED DESCRIPTION OF PREFERRED EMBODIMENTS

FIG. 1 is a cross-section, not to scale, of the rotor blade according to the invention which is provided at a right angle to the longitudinal direction L which in the figure extends at a right angle to the plane of the drawing. Dark areas K represent adhesion areas, the areas A hatched to the right represent regions with first, high-temperature-resistant foam materials and the areas B hatched to the left represent regions with second, low-temperature-resistant foam materials.

The rotor blade comprises a half shell 1 on the under-pressure side and a half shell 2 on the over-pressure side; the half shell 1 of the rotor blade on the under-pressure side is illustrated at the top in the figure and the half shell 2 of the rotor blade on the over-pressure side is illustrated at the bottom in the figure.

The two half shells 1, 2 of the rotor blade are glued to each other on the front edges 4 thereof leading in the direction of rotation of the rotor blade in the assembled state and on the rear edges 6 thereof trailing in the operative state in the direction of rotation. The two half shells 1, 2 of the rotor blade glued to each other form an interior of the rotor blade. In particular, in order to increase the buckling rigidity and bending rigidity of the rotor blade a web 3 is arranged substantially in the portion of the largest internal distance of the two half shells 1, 2 of the rotor blade from each other. The web 3 connects the two inner walls of the half shells 1, 2 of the rotor blade to each other in a fixed manner and keeps them at a constant distance from each other. The web 3 is designed in the form of a single web in FIG. 1, but double webs and/or webs additionally extending along the rear edge 6 are also provided in other embodiments of the rotor blade according to the invention.

The areas between the front edge 4 and the belts 7, 8 and the areas between the rear edge 6 and the belts 7, 8 are formed in a sandwich design which comprises a solid fibre-containing outer layer 21 and a solid fibre-containing inner layer 22 between which lower- and higher-temperature-resistant foam materials 23, 24 are arranged according to the invention.

A high-temperature-resistant foam material 23 is arranged in each case both along an edge—towards the front edge— and an edge—towards the rear edge—of the belt 7 on the under-pressure side and of the belt 8 on the over-pressure side. The high-temperature-resistant foam material 23 extends along the entire edges of the belts 7, 8. The high-temperature-resistant foam material 23 separates the belts 7, 8 from the low-temperature-resistant foam material 24.

In addition, a high-temperature-resistant foam material 23 is provided on the edge of the rotor blade half shell 1 on the under-pressure side extending along the front edge 4 as well as on the edge of the rotor blade half shell 1 on the under-pressure side extending along the rear edge 6. Corresponding remarks apply to the other rotor blade half shell 2 on the over-pressure side.

In this way, starting from the front edge 4, the following sequence of materials is found in the case of the two half shells 1, 2 of the rotor blade along the cross-section in the interior of the shells: high-temperature-resistant foam material, low-temperature-resistant foam material, high-temperature-resistant foam material, belt, high-temperature-resistant foam material, low-temperature-resistant foam material, high-temperature-resistant foam material.

The web 3 is likewise produced in the sandwich design, and it has two outer solid fibre-containing layers of fabric 31, 32 which embrace a low-temperature-resistant foam material 24, the web bases 9, 11 having a high-temperature-resistant foam material 23. The high-temperature-resistant foam material extends along the entire web base 9, 11 in the longitudinal direction L.

In order to produce the rotor blades the two rotor blade half shells 1, 2 are produced separately from each other in production moulds provided therefor in each case. The web 3 is likewise produced separately in its own production mould.

In order to produce the half shells 1, 2 of the rotor blade a plurality of lattice layers are laid one above the other in the respective production mould. The dry structure of the lattice is also referred to as a semi-finished product in this case. The layered structure of the half shells 1, 2 of the rotor blade varies along the cross-section. Belts 7, 8 extending in the longitudinal direction L of the half shells 1, 2 of the rotor blade are provided in the region of the greatest clear internal distance of the two half shells of the rotor blade from each other. The belts have a multiple-layer structure with fibre-containing, partially carbon-containing, lattice layers. The belts 7, 8 are particularly capable of being mechanically loaded.

After the dry fibre-containing semi-finished product in a different consistency in cross-section is positioned on the mould, the semi-finished product is infused with a resin system.

To this end, conventional RIM methods (resin injection moulding) can be used. The RIM method is a type of vacuum infusion method. In vacuum infusion methods a resin system is sucked into a laminate by vacuum pressure. The vacuum infusion method is usually characterized in that the dry fibre-containing semi-finished product inserted into the production mould is covered from the outside with a substantially air-tight vacuum foil and the edges thereof are glued to the production mould. Resin-supply lines extend by way of connections provided at preferably central points of the vacuum-tight foil into the interior which is closed in an air-tight manner and which accommodates the fibre-containing semi-finished product. The interior is surrounded by an annular vacuum line to which a vacuum pump is attached by way of a hose. After the vacuum pump is connected, an under-pressure, which also spreads inside the fibre-containing semi-finished product, is formed in the interior between the support face and the vacuum-tight foil. After that, the connection is opened and the resin system is sucked into the fibre-reinforced semi-finished product through the resin supply line. In this case care is taken in particular to prevent the formation of bubbles and to distribute the resin system uniformly inside the semi-finished product. If the fibre-reinforced semi-finished product is completely impregnated with the resin system, the supply of resin is interrupted and the vacuum pump is switched off.

Resin systems which are generally used comprise a resin component and a hardener. The resin system starts the hardening process automatically while passing through an exothermic peak. The hardening procedure can quite possibly last several hours. Exothermic peaks can have temperatures of 180° C.; there are also resin systems, however, which have a lower exothermic peak at about 40° C. to 120° C.

In order that the resin system should harden completely, the fibre-containing semi-finished product infused with the resin system has to be heated to a process temperature after passing through the exothermic peak. The process temperature has to be maintained over the entire infused area during the entire duration of the hardening.

While passing through the exothermic peak the temperature distribution is different along the shell of the rotor blade of the same resin system used. During the production of the half shells 1, 2 of the rotor blade a higher process temperature occurs along the belts 7, 8 than in the area of the half shells 1, 2 of the rotor blade containing foam material. According to the invention therefore, a high-temperature-resistant foam material 23, which withstands the higher temperature stressing during the hardening procedure without being damaged, is provided in the areas adjacent to the belt, whereas a low-temperature-resistant foam material 24, which is less temperature-resistant, is provided in the other areas of the half shells.

After the individual parts of the rotor blade 1, 2, 3 have been produced separately, they have to be glued to one another.

The web has one base 9, 11 in each case on its narrow sides. During the assembly of the rotor blade the webs 3 are glued with one of their bases 9, 11 to one of the two opposed belts 7, 8 in each case along the belts 7, 8. There adhesion areas K are provided on each of the two web bases 9, 11. The two rotor blade half shells 1, 2 and the web 3 produced are glued to one another to form the rotor blade.

An exothermic reaction also occurs during the adhesion procedure itself. In this case heat is developed in a manner dependent upon the thickness of the layer of adhesive and the geometry tolerances. The thicker the layer of adhesive, the more heat is developed and the hotter the layer of adhesive and the area surrounding it become.

According to the invention a high-temperature-resistant foam material 23, which also withstands the adhesion procedure without being damaged, is likewise provided along the areas of the rotor blade half shells 1, 2 and the web 3 to be glued. The high-temperature-resistant foam material 23 is provided along the front edge 4 of the rotor blade half shells 1, 2 and the rear edge 6 of the rotor blade half shells 1, 2. In addition, the two narrow sides of the webs 3 facing the belts 7, 8, the web bases 9, 11, are completely formed by a high-temperature-resistantfoam material 23 which is also sandwiched by two outer layers in the region of the web bases 9, 11.

The low-temperature-resistant foam material 24 is for example polystyrene, for example Compaxx® 900 of the firm Dow Chemical, with a temperature resistance of −50° C. to +75° C., whilst the high-temperature-resistant foam material can be either PVC or PET, but it can also be SAN or PU foam materials, the temperature resistance of which is also above 180° C. After the hardening of the laminate is complete, the low-temperature-resistant foam material, in particular, should have the original mechanical properties, in particular the mechanical properties to be achieved by other foam materials, with respect to the rigidity and strength. In addition, during the hardening the foam material should have an adequate degree of rigidity and strength, so that significant deformation does not occur under vacuum pressure. The hardening procedure is also a suitable choice of a combination of the hardening temperature and the duration.

LIST OF REFERENCES 1 rotor blade half shell on the under-pressure side
2 rotor blade half shell on the over-pressure side
3 web
4 front edges
6 rear edges
7 belt
8 belt
9 web base
11 web base
21 outer position
22 inner position
23 high-temperature-resistant foam material
24 low-temperature-resistant foam material
A areas with first, high-temperature-resistant foam materials
B areas with second, low-temperature-resistant foam materials
K adhesion areas
L longitudinal direction

The invention claimed is:

1. A method of producing a rotor blade, comprising a foam material (23, 24) arranged in a semi-finished product comprising a plurality of layers laying in a manufacturing mold, resin is introduced into the semi-finished product containing foam material, the resin introduced is hardened during the dissipation of heat and a hardening temperature distribution is produced in this case, characterized in that a first foam material (23) is provided in regions of the semi-finished product in which a first hardening temperature is set and a second foam material (24) is provided in regions in which a second hardening temperature is set, and the first foam material (23) selected is a foam material with a higher temperature resistance than the second foam material (24), and the first hardening temperature is made higher than the second hardening temperature and characterized in that at least one belt (7, 8) is arranged along the semi-finished product of a half shell (1, 2) of a rotor blade with longitudinal sides extending along the half shell (1, 2) of the rotor blade, and the first foam material (23) is arranged in a strip along the longitudinal sides of the at least one belt (7, 8) between the at least one belt (7, 8) and the second foam material (24).

2. A method according to claim 1, characterized in that the first foam material (23) is arranged along adhesion areas and/or along belts (7, 8).

3. A method according to claim 1, characterized in that the first foam material (23) is arranged in a strip directly along a front edge and/or rear edge (4, 6) of the semi-finished product of the half shell (1, 2) of the rotor blade, and is glued by means of an adhesion area along the front edge and/or rear edge (4, 6) to the front edge and/or rear edge (4, 6) of a corresponding half shell of the rotor blade (1, 2) and the second foam material (24) is arranged at a distance from the front edge and/or rear edge (4, 6).

4. A method according to claim 1, characterized in that the first foam material (23) is arranged in a semi-finished product of a web (3) having opposed bases (9, 11) along the web bases (9, 11).

5. A rotor blade comprising a foam material (23, 24) and a resin which is introduced into the foam material (23, 24) and hardens with the dissipation of heat and which forms a hardening temperature distribution, characterized in that a first foam material (23) is provided in regions of the semi-finished product in which a first hardening temperature is set and a second foam material (24) is provided in regions in which a second hardening temperature is set, and the first foam material (23) has a higher temperature resistance than the second foam material (24), and the first hardening temperature is higher than the second hardening temperature and characterized in that the half shell (1, 2) of the rotor blade and the corresponding half shell (1, 2) of the rotor blade have one belt (7, 8) in each case and the first foam material (23) is arranged in the form of a strip along the belts (7, 8) between the belts (7, 8) and the second foam material (24).

6. A rotor blade according to claim 5, characterized by a half shell (1, 2) of a rotor blade and a corresponding half shell (1, 2) of a rotor blade, and in that the first foam material (23) is arranged in the form of a strip along adhesion areas between front edges and/or rear edges (4, 6) of the half shells (1, 2) of the rotor blade in the form of a strip along the half shells (1, 2) of the rotor blade.

7. A rotor blade according to claim 5, characterized by a web (3), and in that the web (3) has opposed bases (9, 11) and the first foam material (23) is arranged in the form of a strip along the web bases (9, 11).

8. A rotor blade according to claim 5, characterized in that the first foam material (23) originates from the group PVC, SAN and PU.

9. A rotor blade according to claim 5, characterized in that the second foam material (24) is a polystyrene.

* * * * *